US006937387B1

(12) United States Patent
Saint Georges et al.

(10) Patent No.: US 6,937,387 B1
(45) Date of Patent: Aug. 30, 2005

(54) SYSTEM AND METHOD FOR AUTOMATIC RECOVERY FROM A CONTROL LOOP FAILURE

(75) Inventors: Eric B. Saint Georges, Cupertino, CA (US); Paul C Talmadge, Ansonia, CT (US)

(73) Assignee: Tellabs Operations, Inc., Naperville, IL (US)

( * ) Notice: Subject to any disclaimer, the term of this patent is extended or adjusted under 35 U.S.C. 154(b) by 280 days.

(21) Appl. No.: 10/209,423

(22) Filed: Jul. 30, 2002

Related U.S. Application Data

(60) Provisional application No. 60/308,940, filed on Jul. 30, 2001.

(51) Int. Cl.[7] ................................................ H01S 3/00

(52) U.S. Cl. ............................. 359/337.11; 359/341.41

(58) Field of Search ...................... 359/337.11, 341.41; 398/37

(56) References Cited

U.S. PATENT DOCUMENTS

| 5,864,423 | A | * | 1/1999 | Kosaka | 359/337.11 |
| 6,160,659 | A | * | 12/2000 | Kinoshita | 359/337 |
| 6,307,670 | B1 | * | 10/2001 | McNamara | 359/341.33 |
| 6,529,316 | B1 | * | 3/2003 | Treyz et al. | 359/337.11 |

* cited by examiner

*Primary Examiner*—Bernarr E. Gregory
*Assistant Examiner*—Deandra M. Hughes
(74) *Attorney, Agent, or Firm*—Baker Botts L.L.P.

(57) ABSTRACT

A voltage potential at a selected one or more inputs is controlled in order to produce a gain associated with an optical amplifier. One or more characteristics associated with a feedback loop coupled to the optical amplifier may be stored. A signal may be communicated to identify the occurrence of an error associated with the feedback loop. A selected current value may be provided to an element such that the optical amplifier is restored to a state associated with the optical amplifier prior to the failure. The selected current value is based on one or more of the characteristics associated with the feedback loop.

20 Claims, 2 Drawing Sheets

US 6,937,387 B1

SYSTEM AND METHOD FOR AUTOMATIC RECOVERY FROM A CONTROL LOOP FAILURE

RELATED APPLICATIONS

The present application claims benefit to U.S. Provisional Application No. 60/308,940 dated Jul. 30, 2001.

TECHNICAL FIELD OF THE INVENTION

This invention relates in general to the field of optical communications and more particularly to a system and method for automatic recovery from a control loop failure.

BACKGROUND OF THE INVENTION

Optical networks are communication systems that use light waves as a medium for the transmission or the switching of data or information. Pure optical or all-optical networks may use light exclusively from end to end. Opto-electronic networks may rely on electronic equipment to perform one or more tasks (generally switching) and may require a conversion of information from an electronic form to an optical one. This conversion may be complex and result in a reduction in data communication speed because of the state or format change implemented for data propagating through an associated architecture.

Optical communication systems have enjoyed sustained notoriety in today's marketplace because they may generally provide cost-effective bandwidth, noise isolation capabilities, greater security, and a smaller physical presence. One drawback associated with optical networks, however, is that certain elements within the network architecture may be susceptible to failure. Such failures may be detrimental in cases where backup systems or failover features are not provided to a corresponding architecture. Such failures may be particularly problematic for optical amplifiers that operate to filter, equalize, or amplify a received signal. If an optical amplifier fails, all components that depend on the optical amplifier may also suffer or be rendered incapable of operating properly. This scenario may present significant problems to any component or object coupled to the optical amplifier or positioned downstream of the amplifier.

SUMMARY OF THE INVENTION

From the foregoing, it may be appreciated by those skilled in the art that a need has arisen for an improved failover capability for an optical amplifier. In accordance with one embodiment of the present invention, a system and method for automatic recovery from a control loop failure are provided that substantially eliminate or greatly reduce disadvantages and problems associated with conventional amplifier failover techniques.

According to one embodiment of the present invention, there is provided a method for automatic recovery from a control loop failure that includes controlling a voltage potential at a selected one or more inputs in order to produce a gain associated with an optical amplifier. One or more characteristics associated with a feedback loop coupled to the optical amplifier may be stored. A signal may be communicated to identify the occurrence of an error associated with the feedback loop. A selected current value may be provided to an element such that the optical amplifier is restored to a state associated with the optical amplifier prior to the failure. The selected current value is based on one or more of the characteristics associated with the feedback loop.

Certain embodiments of the present invention may provide a number of technical advantages. For example, according to one embodiment of the present invention, a failover approach is provided that offers considerable flexibility in maintaining a state associated with an optical amplifier. This may further provide a recovery mode or restoration feature for an optical network such that a component within the network does not suffer in cases where the optical amplifier becomes inoperable. This failover element may further allow for enhanced efficiency and reduced error generation in corresponding optical network architectures. This provides a system redundancy such that even in cases where a system experiences a problem, the optical amplifier may still continue to function properly. This may further allow the optical amplifier to continue to receive input signals and amplify them appropriately such that system outputs associated with the architecture are maintained. This improved consistency in operation may also be inclusive of ancillary components or elements that rely on the optical amplifier within the communications network. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
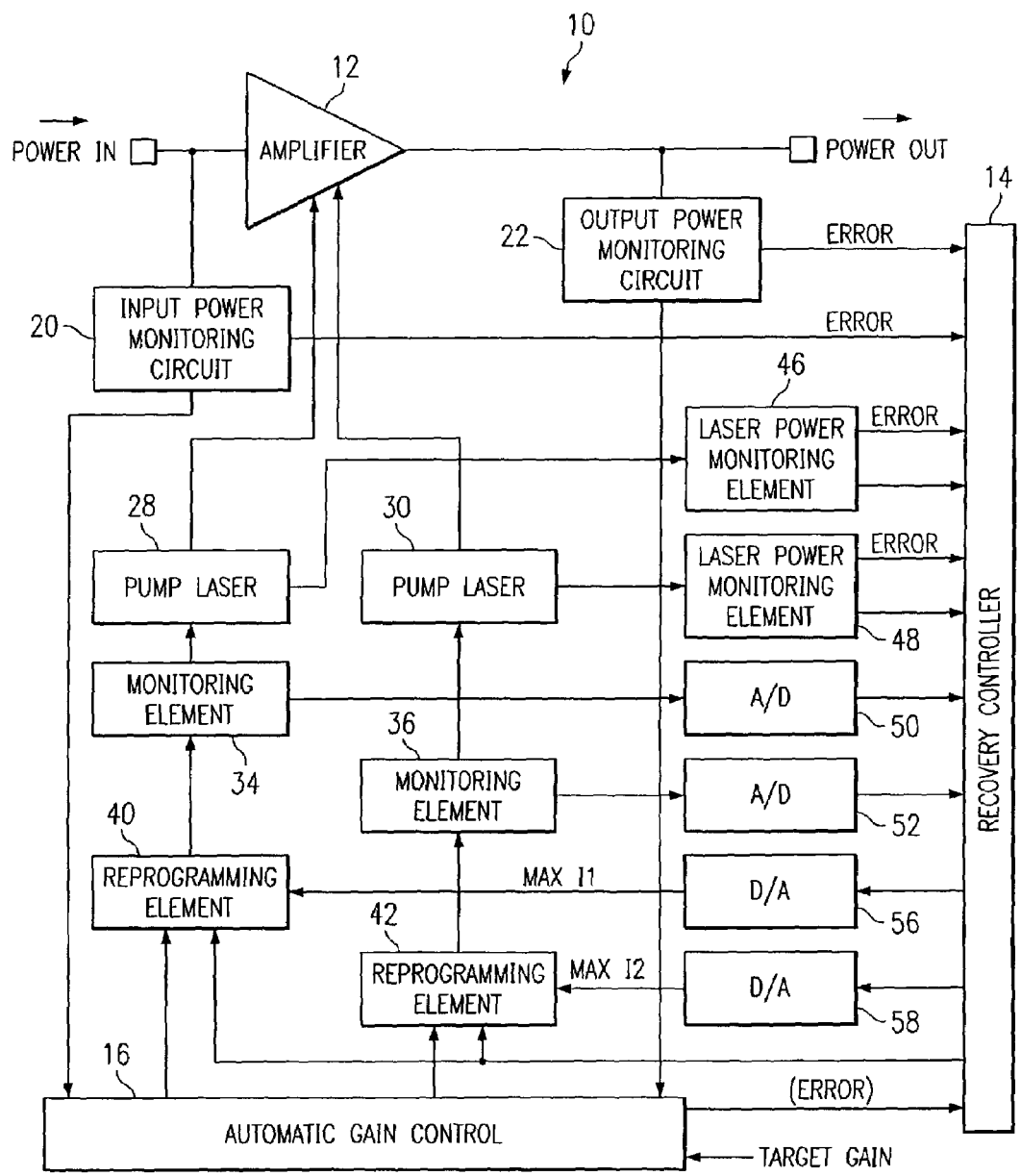
FIG. 1 is a simplified block diagram of an optical communication system.

FIG. 1 is a simplified block diagram of an optical communication system 10 in accordance with one embodiment of the present invention. Optical communication system 10 includes an optical amplifier 12, a recovery controller 14, an automatic gain control 16, an input power monitoring circuit 20, and an output power monitoring circuit 22. Additionally, optical communication system 10 includes pump lasers 28 and 30, monitoring elements 34 and 36, reprogramming elements 40 and 42, laser power monitoring elements 46 and 48, analog to digital converters 50 and 52, and digital to analog converters 56 and 58. One or more of these elements may be collectively referred to as a 'feedback loop' or 'feedback control loop' that is operable to provide a predetermined power output based on an input received by optical amplifier 12. Optical communication system 10 may be positioned in any suitable location within or external to an optical network in order to facilitate the delivery, transmission, or switching of optical information or data in an optical communications environment.

In accordance with the teachings of the present invention, optical communication system 10 monitors one or more elements in order to detect the occurrence of a failure or an error. Once a failure or an error is detected, optical communication system 10 may manage, designate, assign, or otherwise control one or more elements within the corresponding architecture in order to generate a state associated with optical amplifier 12 that existed prior to the occurrence of the failure or the error.

This restoration or reprogramming of optical amplifier 12 may be effectuated with use of recovery controller 14 and reprogramming elements 40 and 42. The gain of optical amplifier 12 may be controlled with a feedback loop, whereby the gain of optical amplifier 12 changes as the input power changes. By continuously monitoring one or more parameters controlled by the feedback loop, such as current settings for example one or more values associated with the feedback loop may be monitored or otherwise recorded. After an error or a system failure is detected, these same values may be used to reprogram the appropriate elements in order to restore optical amplifier 12 to a suitable condition or an operable state. This state may be an ideal or a theoretical value or, alternatively, the state may be associated with a condition experienced prior to the occurrence of the error or failure.

The implementation of a suitable feedback control loop provides a management feature or a failover element for operations associated with optical amplifier 12. The feedback control loop may be utilized by optical amplifier 12 to maintain a steady state or to generate a desired power output. The feedback control loop may also ensure that optical amplifier 12 provides a consistent specified gain. The gain may be based for specific needs or selected based on a theoretical computed gain. Proper amplifier performance may be adversely affected by a failure or an error that develops within the feedback control loop. This failure may be due to a component, an element, a communications link, or any other unit or object that is relied on for the propagation of optical information or data within a corresponding system. Such errors may be accounted or compensated for by optical communication system 10 such that optical amplifier 12 maintains its proper functionality during such periods of error.

Optical amplifier 12 is an element that receives optical energy and uses the feedback control loop in order to generate a power output signal. Optical amplifier 12 may detect, regenerate, amplify, or otherwise modify an incoming power signal in order to produce a selected output. Optical amplifier 12 may also be referred to as a 'repeater' and may be capable of reproducing an optical signal or any portion thereof generated at any location within an associated optical network. In accordance with one embodiment of the present invention, optical amplifier 12 is an erbium doped fiber amplifier (EDFA). Alternatively, optical amplifier 12 may be any other suitable amplifier, potentially inclusive of a semiconductor material and suitably doped with any other appropriate element such that an input signal is properly amplified or reproduced and communicated to a suitable next destination. The input to optical amplifier 12 may be supplied by pump lasers 28 and/or 30. The erbium element within optical amplifier 12 may include state transitions which cause the emission of photons concurrently with the reception of an incoming signal.

Optical amplifier 12 may make appropriate adjustments to power provided by pump lasers 28 and 30 when there is change provided in input power. These adjustments of pump lasers 28 and 30 may be effectuated through operation of a feedback control loop (inclusive of automatic gain control 16). This operation may bring the power output of optical amplifier 12 back to its targeted value and thereby compensate for the change in input power provided to optical amplifier 12.

The changes in input power may result from an upstream fault of some sort within the optical network associated with optical amplifier 12. Without a system that protects in some way against the failure for an associated feedback control loop, the control loop may become 'open' and lead to an undesirable diversion of the amount of supplied pump power to pump lasers 28 and 30. This in turn may result in severe disruption of data traffic carried by optical communication system 10. If the feedback control loop becomes 'open' and the associated pump power ascends to a maximum level, a downstream receiver or other element may saturate. If alternatively the feedback control loop becomes 'closed' and the pump power moves to a substantially lower power level, data traffic may be interrupted by the lowered power levels provided by optical amplifier 12. Thus, optical communication system 10 may avoid both of these problematic issues with the implementation of recovery controller 14. Recovery controller 14 which may operate to reprogram one or more elements in order to maintain or otherwise restore a state associated with optical amplifier 12.

Recovery controller 14 is an element that receives one or more error or failure signals from selected components within optical communication system 10. For example, input power monitoring circuit 20 and output power monitoring circuit 22 are each coupled to recovery controller 14 and may each generate and send an error message to recovery controller 14 indicating that either the power input or the power output values associated with optical amplifier 12 are at inappropriate levels. Recovery controller 14 may also receive error signals or messages from laser power monitoring elements 46 and 48 that indicate a pump laser failure or an error has occurred.

Recovery controller 14 may be a field programmable gate array (FPGA) in accordance with one embodiment of the present invention. Alternatively, recovery controller 14 may be an erasable programmable read-only memory (EPROM), an electrically erasable programmable read-only memory (EEPROM), a digital signal processor (DSP), a microprocessor, a micro-controller, or any other suitable digital circuitry or programming element operable to receive one or more error signals and to assist in reprogramming elements within optical communication system 10. This reprogramming feature may operate to restore optical amplifier 12 to a state associated with optical amplifier 12 prior to a failure or an error that was detected. This operation may be inclusive of setting one or more suitable elements within optical communication system 10 in order to produce this result or effectuate this end.

Recovery controller 14 may provide for a fast and automatic recovery for optical amplifier 12 in the event of a failure within the feedback loop. Recovery controller 14 may be used to systematically monitor and record, as frequently as appropriate characteristics of the feedback control loop such that in the event that a feedback control loop failure is detected, the recorded characteristics may be used to overcome the failure or error introduced into the system. In addition, the stored characteristics may allow for a quick restoration of optical amplifier 12 to a substantially similar state in which it was operating prior to the failure or error. This type of failover security or fault management may be particularly beneficial in optical systems that have periods of relatively steady state operations, whereby the parameters of the feedback control loop are not necessarily continuously changing in a significant manner.

Automatic gain control 16 is a feedback element operable to receive one or more signals associated with optical amplifier 12 and to provide feedback data such that one or more parameters may be recorded, modified, or otherwise changed in order to generate a predetermined gain. Automatic gain control 16 may also compute the instantaneous gain of optical amplifier 12 by using information supplied by input monitoring circuit 20 and output monitoring circuit 22. The gain that is computed may be compared by automatic gain control 16 against a targeted or predetermined gain that is supplied to automatic gain control 16 by any suitable element. Differences between the computed instantaneous gain of optical amplifier 12 and the target gain may be eliminated or otherwise reduced by automatic gain control 16 through adjustment of the currents supplied to pump lasers 28 and 30.

The current signals that are provided to reprogramming elements 40 and 42 may be used to drive pump lasers 28 and 30. These signals may be first sent to monitoring elements 34 and 36 in order to ensure that the supplied current does not exceed a maximum threshold that is specified for each of pump lasers 28 and 30. The maximum current thresholds may be provided to reprogramming elements 40 and 42 through signals communicated by recovery controller 14 MAX I1 and MAX I2. These maximum current thresholds may be received by digital to analog converters 56 and 58 and suitably converted to an analog signal format to be received by reprogramming elements 40 and 42. Digital analog converters 56 and 58 may be controlled and programmed by recovery controller 14.

Automatic gain control 16 may adjust one or more currents associated with pump lasers 28 and 30 in a manner whereby the currents are maintained at a level that is below the maximum current capacities specified for each pump laser 28 and 30. The maximum current capacities may be stored in any suitable location within optical communication system 10 or provided external thereto. For example, maximum current capacities may be stored in a suitable EPROM pump module and referenced by automatic gain control 16 when appropriate.

Pump lasers 28 and 30 provide optical energy to optical amplifier 12 such that optical amplifier 12 may produce a target power output. Pump lasers 28 and 30 may be monitored by monitoring elements 46 and 48, whereby a suitable error message may be generated when current signals associated with pump lasers 28 and 30 fall below a predetermined value. The measured instantaneous values of the current signals supplied to pump lasers 28 and 30 may be delivered to analog to digital converters 50 and 52 by monitoring elements 34 and 36. The analog signals produced by the current signals may be converted into a digital format and provided to recovery controller 14. Recovery controller 14 may store these values using registers, buffers, or any other suitable storage location within or external to recovery controller 14 for later reference. For example, recovery controller 14 may use these values at a later time interval in order to recover from a failure in a feedback control loop. The status of the feedback control loop may be continuously monitored by recovery controller 14, potentially in conjunction with input power monitoring circuit 20 and output power monitoring circuit 22 where appropriate, whereby any number of selected components within optical communication system 10 may signal an error or a failure within the system and communicate this information to recovery controller 14.

In operation of an example embodiment, optical amplifier 12 receives a power input and suitably amplifies or reproduces the power input such that a predetermined or selected power output is provided. A fraction of the power input may be directed to a coupler or any other receiving device that is used to monitor the power input. Such a coupler may be used in conjunction with input power monitoring circuit 20 where appropriate. Input power monitoring circuit 20 may communicate information to automatic gain control 16 through a suitable signal that indicates the monitored value of the power input. Input power monitoring circuit 20 may also generate and send an error signal to recovery controller 14 in the event that a failure is detected by input power monitoring circuit 20. Generally, the delay between the occurrence of such a failure or an error and the generation and transmission of the error signal to recovery controller 14 is shorter than the response time of the feedback control loop. This operates to minimize the introduction of one more transients into the system as a result of the delay.

Output power monitoring circuit 22 behaves in a similar manner and may be inclusive of a coupler or a receiving element that facilitates the monitoring or management of output power from optical amplifier 12. Output power monitoring circuit 22 may communicate a signal to automatic gain control 16 indicating the monitored value of the power output. Output power monitoring circuit 22 may also generate and send an error signal to recovery controller 14 in the event of failure detector. The delay between the occurrence of such a failure and/or the generation or transmission of an error signal to recovery controller 14 is generally shorter than the response time of the feedback control loop.

Automatic gain control 16 may be instantaneously or systematically computing the gain of optical amplifier 12 by using information supplied by input power monitoring circuit 20 and output power monitoring circuit 22. This information may be compared to predetermined targeted gains supplied to automatic gain control 16. Differences between the computed instantaneous gain of optical amplifier 12 and the targeted gain may be eliminated by automatic gain control 16 through adjustment of the currents supplied to pump lasers 28 and 30. The current signals used to drive pump lasers 28 and 30 may be first sent to reprogramming elements 40 and 42 in order to ensure that the supplied current does not exceed a maximum threshold specified for each of pump lasers 28 and 30.

Additionally, the instantaneous optical power generated by pump lasers 28 and 30 may be monitored by laser power monitoring elements 46 and 48. Laser power monitoring elements 46 and 48 may deliver this information to recovery controller 14. Each of laser power monitoring elements 46 and 48 may also generate a suitable error signal when a selected one of pump lasers 28 and 30 produce a failure or an error. These error signals may be delivered to recovery controller 14 in order to indicate that a pump laser failure has occurred. This information may be used to appropriately adjust the feedback control loop in the event that one of pump lasers 28 and 30 fail.

Recovery controller 14 may respond to the receipt of error signals by responding in an appropriate manner to restore one or more elements associated with optical amplifier 12. In cases where automatic gain control 16 reports an error, recovery controller 14 may maintain or return the pump current for pump lasers 28 and 30 to the same value measured before the failure. In the case where an error is generated and communicated by input power monitoring circuit 20, recovery controller 14 may similarly maintain or return pump current to the same value measured before the failure.

Recovery controller 14 may initiate and implement a system recovery upon detection of a feedback control failure through error signals as described above. If the system failure alternatively resides with pump laser 28 or pump laser 30, the feedback control loop may undertake an action to correct for such a failure without an intervention by recovery controller 14. In order to control one or more pump currents such that a constant amplifier gain is maintained, reprogramming elements 40 and 42 may be used to set an appropriate maximum current threshold. This enables a maximum current mode for pump lasers 28 and 30 as designated by reprogramming elements 40 and 42, whereby suitable limiting circuitry may be used to ensure a designated range. The appropriate maximum current threshold values may be those values that require the amplifier to continue to provide a constant gain that compensates for the detected feedback control loop failure. The maximum current threshold values that are used by reprogramming elements 40 and 42 may be values that correspond to the latest working state measured before the failure occurred or, alternatively, the current values may be theoretical or predetermined based on a suitable computation or an algorithm. The measured and stored pump laser current values may be retrieved from an appropriate register included within recovery controller 14 and communicated or programmed into reprogramming elements 40 and 42, potentially on a continuous basis where appropriate.

Depending on the ultimate responsiveness of the detection of the feedback control loop failures, the last measured set of pump laser current values, prior to detection of the failure, may not be sufficiently reliable for use in reprogramming or storing values using reprogramming elements 40 and 42. In this event, recovery controller 14 may be designed to retain historical measurements, theoretical measurements, or algorithm-generated measurements and, upon failure of the feedback control loop, the appropriate set of measured pump laser current values may be provided by recovery controller 14. The designated current values may return optical amplifier 12 to a suitable mode of operation that yields the appropriate amount of amplifier gain.

Figure 2:
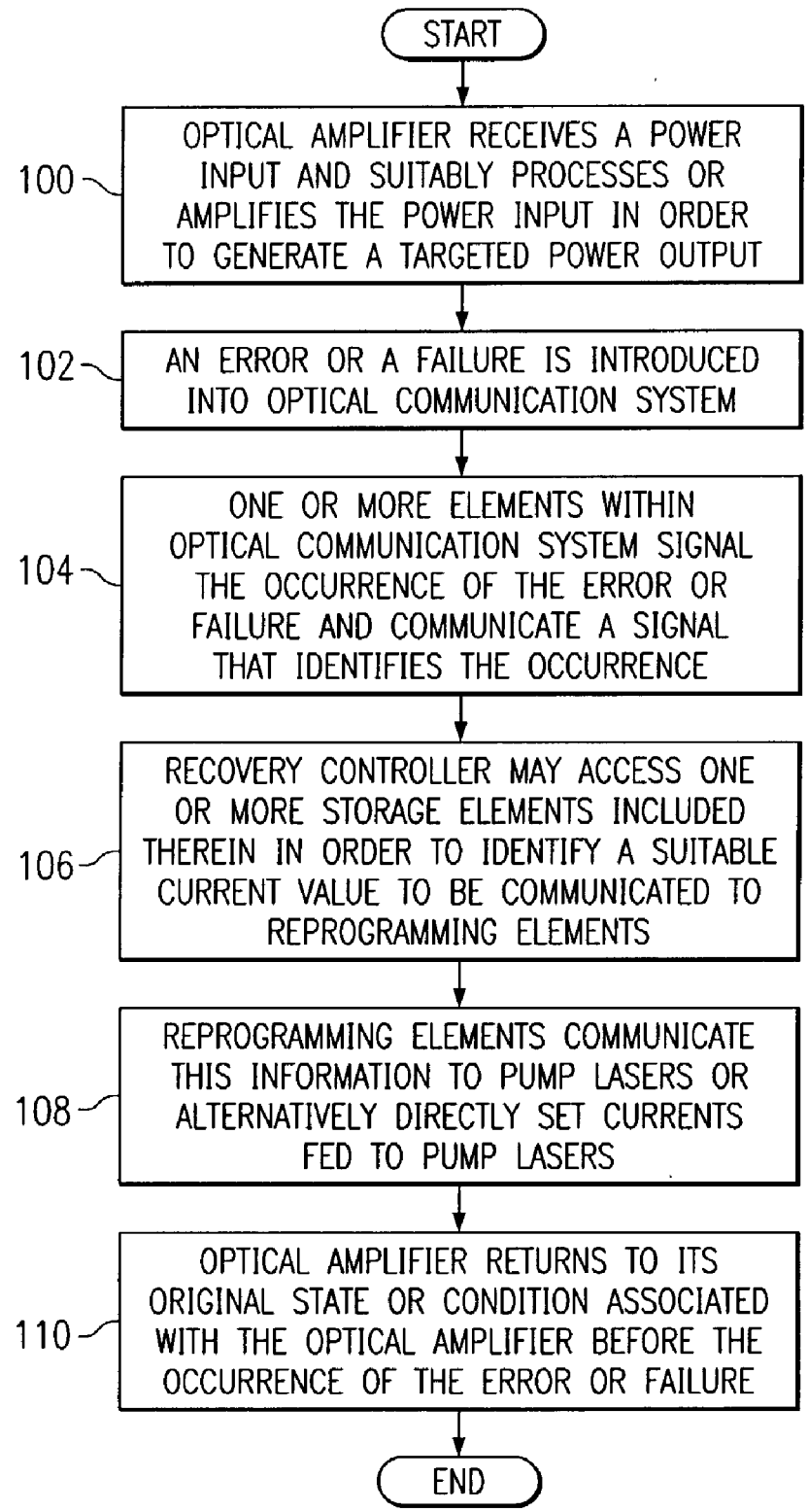
FIG. 2 is a flowchart illustrating a series of example steps associated with a method for automatic recovery from a control loop failure performed by the optical communication system.

FIG. 2 is a simplified flowchart illustrating a series of example steps associated with a method for maintaining one or more parameters associated with optical amplifier 12. The method begins at step 100 where optical amplifier 12 receives a power input and suitably processes or amplifies the power input in order to generate a targeted power output. At step 102, an error or a failure is introduced into optical communication system 10. At step 104, one or more elements within optical communication system 10 may signal the occurrence of the error or failure and communicate a signal that identifies this occurrence. The signal may be communicated to recovery controller 14.

At step 106, recovery controller 14 may access one or more storage elements included therein in order to identify a suitable current value to be communicated to reprogramming elements 40 and 42. Reprogramming element 40 and 42 may then communicate this information to pump lasers 28 and 30 at step 108. The current values may also be directly set by reprogramming elements 40 and 42 such that pump lasers 28 and 30 provide the requisite input to optical amplifier 12. At step 110, optical amplifier 12 may return to its original state or condition associated with optical amplifier 12 before the occurrence of the error or failure. In some cases the delay in restoring optical amplifier 12 is minimal such that one or more elements that are dependent on optical amplifier 12 do not experience time intervals of non-operation. This offers continued functionality to all associated elements within optical communication system 10 even in times of component or element failure.

Some of the steps illustrated in FIG. 2 may be changed or deleted where appropriate and additional steps may also be added to the flowchart. These changes may be based on specific optical system architectures or particular networking arrangements or configurations and do not depart from the scope or the teachings of the present invention.

Although the present invention has been described in detail with reference to particular embodiments, it should be understood that various other changes, substitutions, and alterations may be made hereto without departing from the spirit and scope of the present invention. For example, although the present invention has been described with reference to an EDFA amplifier, any suitable amplifier may be used such that a suitable gain is produced and a constant state associated with the amplifier is maintained. The recovery or restoration methods as described in conjunction with optical communication system 10 additionally include any applications for control feedback loops or amplifying systems that depend on one or more internal elements for continued operation or functionality.

In addition, although FIG. 1 illustrates an arrangement of selected elements, such as digital to analog converters and monitoring circuits, numerous other components may be used in combination with these elements without departing from the teachings of the present invention. For example, elements such as optical switches, optical multiplexers, filters, diffraction gratings, couplers, splitters, and numerous other suitable components may be included or coupled to optical communication system 10. The embodiment illustrated in FIG. 1 has only been offered for purposes of teaching and where appropriate may be inclusive of various other suitable components that facilitate the recovery or the restoration from one or more component or element failures.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for automatic recovery from a control loop failure, comprising:

a feedback loop coupled to an optical amplifier and operable to produce a gain associated with the optical amplifier;

a pump laser included within the feedback loop and coupled to the optical amplifier, the pump laser operable to generate optical energy that is fed to the optical amplifier, the feedback loop operable to provide a current to the pump laser used to generate the optical energy at a selected one or more inputs of the optical amplifier;

a reprogramming element coupled to the feedback loop and operable to set the current that is provided to the pump laser; and a recovery controller coupled to the feedback loop and operable to store one or more characteristics associated with the feedback loop that produce the gain, the recovery controller operable to communicate a signal to the reprogramming element that directs the reprogramming element to provide a selected current value of the current to the pump laser in response to a failure in the feedback loop.

2. The apparatus of claim 1, wherein the optical amplifier adjusts an output power value in response to the pump laser in response to a change in input power provided to the optical amplifier.

3. The apparatus of claim 1, further comprising:
an automatic gain control included within the feedback loop and operable to compute an amplifier gain value associated with the optical amplifier, the automatic gain control operable to adjust one or more currents supplied to the pump laser in response to the amplifier gain value.

4. The apparatus of claim 1, further comprising:
a monitoring element coupled to the pump laser and the reprogramming element and operable to provide a signal to the recovery controller that reflects a current value associated with the pump laser, the monitoring element operable to ensure that a current supplied to the pump laser does not exceed a maximum threshold specified for the pump laser.

5. The apparatus of claim 1, wherein notification of the failure is communicated by an error signal sent to the recovery controller.

6. The apparatus of claim 1, further comprising:
a laser power monitoring element operable to monitor power values provided to the pump laser and to communicate the power values to the recovery controller.

7. The apparatus of claim 1, wherein the optical amplifier comprises a semiconductor material that is doped with erbium.

8. The apparatus of claim 1, wherein the recovery controller is a selected one of a field programmable gate array, a digital signal processor, and a micro-controller.

9. A method for automatic recovery from a control loop failure, comprising:
controlling a current to a pump laser generating optical energy at a selected one or more inputs of an optical amplifier in order to produce a gain associated with the optical amplifier;
storing one or more characteristics associated with a feedback loop coupled to the optical amplifier that produce the gain;
communicating a signal to identify an occurrence of an error associated with the feedback loop; and
providing a selected current value associated with the current of the pump laser to an element such that the optical amplifier is restored to a state associated with the optical amplifier prior to the failure according to the stored characteristics associated with the feedback loop.

10. The method of claim 9, further comprising:
computing an amplifier gain value associated with the optical amplifier comparing the amplifier gain value to a target gain;
adjusting one or more currents supplied to the optical amplifier in order to substantially conform to the target gain.

11. The method of claim 9, further comprising:
communicating, by an error signal, a notification of an error in the feedback loop to a recovery controller; and
responding to the notification by implementing a protocol that provides a predetermined current to the optical amplifier in order to restore the optical amplifier to the state associated with the optical amplifier prior to the failure.

12. The method of claim 11, further comprising:
monitoring power values provided to a pump laser coupled to the optical amplifier; and
communicating the power values to the recovery controller, wherein information associated with the power values may be used by the recovery controller to adjust the feedback loop in the event that the pump laser fails.

13. A system for automatic recovery from a control loop failure, comprising:
means for producing a gain associated with an optical amplifier;
means for controlling a current associated with optical energy provided at a selected one or more inputs of the optical amplifier;
means for generating optical energy for the optical amplifier;
means for storing one or more characteristics associated with producing the gain;
means for restoring the optical amplifier to a state associated with the optical amplifier prior to a failure according to the one or more stored characteristics.

14. The system of claim 13, further comprising:
means for adjusting a power value to the optical amplifier in response to a change in input power at the optical amplifier.

15. The system of claim 13, further comprising:
means for computing an amplifier gain value associated with the optical amplifier;
means for comparing the amplifier gain value to a target gain;
means for adjusting one or more currents in order to substantially conform to the target gain.

16. The system of claim 14, further comprising:
means for providing a signal that reflects a current value associated with the pump valve;
means for ensuring that a current supplied does not exceed a maximum threshold.

17. The system of claim 13, further comprising:
means for communicating an error signal in response to a failure in producing the gain.

18. The system of claim 13, further comprising:
means for monitoring power values used in producing the gain;
means for communicating the power values;
means for adjusting gain in response to the power values.

19. The system of claim 13, further comprising:
storing a history of characteristics.

20. The system of claim 13, further comprising:
selecting one or more characteristics from the history;
restoring the optical amplifier according to the selected characteristics.

* * * * *